(12) United States Patent
Garnero et al.

(10) Patent No.: US 8,934,927 B2
(45) Date of Patent: Jan. 13, 2015

(54) METHOD AND APPARATUS FOR ROUTING SHORT MESSAGES IN MOBILE TELEPHONE NETWORKS

(75) Inventors: Pierre Garnero, Grasse (FR); Philippe Bouckaert, Biot (FR); Herve Troadec, Le Golfe-Juan (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1189 days.

(21) Appl. No.: 11/250,926

(22) Filed: Oct. 14, 2005

(65) Prior Publication Data

US 2006/0084451 A1    Apr. 20, 2006

(30) Foreign Application Priority Data

Oct. 20, 2004   (EP) ..................... 04300698

(51) Int. Cl.
 *H04W 4/00* (2009.01)
 *H04W 40/00* (2009.01)
 *H04W 4/14* (2009.01)
 *H04W 88/18* (2009.01)

(52) U.S. Cl.
 CPC .............. *H04W 4/14* (2013.01); *H04W 88/184* (2013.01)
 USPC .......................................... 455/466; 455/445

(58) Field of Classification Search
 USPC .................................................. 455/466, 445
 See application file for complete search history.

(56) References Cited

U.S. PATENT DOCUMENTS

| | | | | |
|---|---|---|---|---|
| 6,044,275 A * | 3/2000 | Boltz et al. | ..................... | 455/466 |
| 7,319,857 B2 * | 1/2008 | Baldwin et al. | ............ | 455/412.1 |
| 2003/0040325 A1 * | 2/2003 | Clark | ............................. | 455/461 |
| 2004/0171393 A1 * | 9/2004 | Harding | ........................ | 455/466 |
| 2005/0078660 A1 * | 4/2005 | Wood | .............................. | 370/352 |
| 2006/0041622 A1 * | 2/2006 | Qutub et al. | .................. | 709/206 |
| 2006/0148495 A1 * | 7/2006 | Wilson | ........................... | 455/466 |
| 2007/0060131 A1 * | 3/2007 | Wilson | ........................... | 455/445 |
| 2007/0178919 A1 * | 8/2007 | Huggett et al. | ............... | 455/466 |

FOREIGN PATENT DOCUMENTS

| | | |
|---|---|---|
| EP | 1 408 705 A1 | 4/2004 |
| WO | WO 03/036906 A1 | 1/2003 |
| WO | WO 03/081924 A1 | 10/2003 |

OTHER PUBLICATIONS

Cisco Systems; "IP Transfer Point Multilayer Short Message Service Routing Solution", Cisco White Paper, 'Online! Apr. 2003, pp. 1-6, XP 002321430.

"Systems Mesaging in SS7 Networks: Optimizing Revenue with Modular Components"; Intel White Paper, 'Online! Aug. 2003, pp. 1-11, XP002321431.

Hooton, Don, et al., "Nextgen Signaling—what HP is doing to support the network's move to IP", Open Call Insight Days, 'Online! Jan. 27, 2005, pp. 1-31, XP002321432.

* cited by examiner

*Primary Examiner* — Marisol Figueroa

(74) *Attorney, Agent, or Firm* — Richard Lloyd

(57) ABSTRACT

A method for routing short messages using a router in a mobile telecommunications network. The method comprises: receiving a short message from a short message element; attempting to deliver a short message without passing through a store and forward function; and if said attempted delivery fails, directing said short message using a mobile originated procedure to a short message service center having a store and forward function.

19 Claims, 3 Drawing Sheets

METHOD AND APPARATUS FOR ROUTING SHORT MESSAGES IN MOBILE TELEPHONE NETWORKS

FIELD OF THE INVENTION

The present invention relates to methods and apparatus for routing short message traffic in mobile telephone networks.

BACKGROUND OF THE INVENTION

In the Global System for Mobile Communication (GSM), the short message service (SMS) allows mobile stations (MS) and hosts to send and receive short text and other messages. The messages are routed via a short message service centre (SMSC) which provides a complex store and forward function.

The functionality of the SMSC is outside the scope of the GSM standards and as a result no standardised interfaces have been developed for the bulk transmission and reception of SMS messages by an SMSC from a fixed network interface. In the absence of a prevailing standard, developers have devised their own proprietary protocols which have not necessarily been based on any existing standards and are therefore largely incompatible with one another.

The protocols currently used are as follows: SMPP (Short message peer-to-peer) is the most common protocol and the only non-proprietary one in wide use; EMI/UCP (External Machine Interface/Universal Computer Protocol) is a proprietary protocol developed by LogicaCMG; CIMD (Computer Interface to Message Distribution) is a proprietary protocol developed by Nokia for its own SMSC product; and OIS (Open Interface Specification) is a proprietary protocol developed by SchlumbergerSema.

Although the store and forward nature of the SMS service has advantages, the storage facilities required have a significant cost. Consequently SMSCs are relatively expensive pieces of equipment.

To address this problem, SMS router elements have been developed that enable SMS messages to be directed in the first instance to an SMS router which attempts delivery directly without passing through a store and forward function. If delivery fails then the messages are directed to an SMSC which provides a store and forward function for repeated attempted delivery of the messages. Such SMS routers are relatively inexpensive items compared to the cost of an SMSC and serve to relieve the SMSC from having to process the portion of the total traffic that can be delivered directly. Experience shows that with currently deployed networks 70%-80% of the SMS message deliveries may succeed on the first attempt. The capacity of the SMSC can therefore be lowered considerably using such devices.

SMS routers are currently available from a number of manufacturers, such as the Direct Delivery Message Router product available from CMGLogica, for instance.

However in present arrangements each node (SMS router and SMSC) needs to provide SS7 connectivity for delivery of the messages and the SMSC needs to implement and support the particular transmission protocol used by the SMS router. In practice, this means that a commercially viable SMS router product may need to implement several protocols to enable it to be used with a range of SMSCs from different manufacturers.

Furthermore, since the same bulk transmission protocol is used by the SMS router to trigger the store and forward procedure in the SMSC, and due to the fact that this protocol is in general asymmetric, the SMS router needs to implement both sides of the protocol.

This invention is directed to providing a cost-effective alternative architecture that can allow operators to avoid, or at least reduce, the use of proprietary interfaces.

SUMMARY OF THE INVENTION

In brief, to achieve this the invention provides a method for routing short messages in a mobile telecommunications network, the method comprising: receiving a short message from a short message element; attempting to deliver a short message without passing through a store and forward function; and, if said attempted delivery fails, directing said short message using a mobile originated procedure to a short message service center having a store and forward function.

In at least preferred embodiments, the message is directed to the short message service center via a SIGTRAN gateway, for instance, over an IP network.

In this way, the SMSC no longer requires SS7 connectivity.

In this case, the gateway function can serve to relay messages generated as part of a mobile terminated procedure triggered by the mobile originated procedure between elements on a SS7 network and the short message service center.

The method can comprise issuing a response to the short message element indicating delivery of the short message upon receipt at a router of an acknowledgement message that forms part of the mobile terminated procedure.

Viewed from another aspect the invention provides a router for delivering short messages in a mobile telecommunications network, the router comprising: a receiver for receiving a short message from a short message element and control logic arranged to attempt to deliver a short message without passing through a store and forward function; and if said attempted delivery fails, to direct said short message using a mobile originated procedure to a short message service center having a store and forward function.

The router can comprise a signalling gateway, such as a SIGTRAN gateway, wherein the message is directed to the short message service center via the gateway.

Using the above-described techniques, the cost of the SMSC can be reduced: there is no need for a SS7 connectivity on the router node and the SMSC itself does not have to provide support for any proprietary protocols. This means that the router element can be implemented as a more standardised product, and therefore potentially at lower cost.

Moreover, the architecture of the router is also simplified since it only needs to provide the server side of the proprietary bulk transmission protocols used to receive the messages from a fixed network interface.

BRIEF DESCRIPTION OF THE DRAWINGS

An embodiment of the invention will now be described, by way of non-limiting example, with reference to the accompanying diagrammatic drawings, in which.

BEST MODE OF CARRYING OUT THE INVENTION

Figure 1:
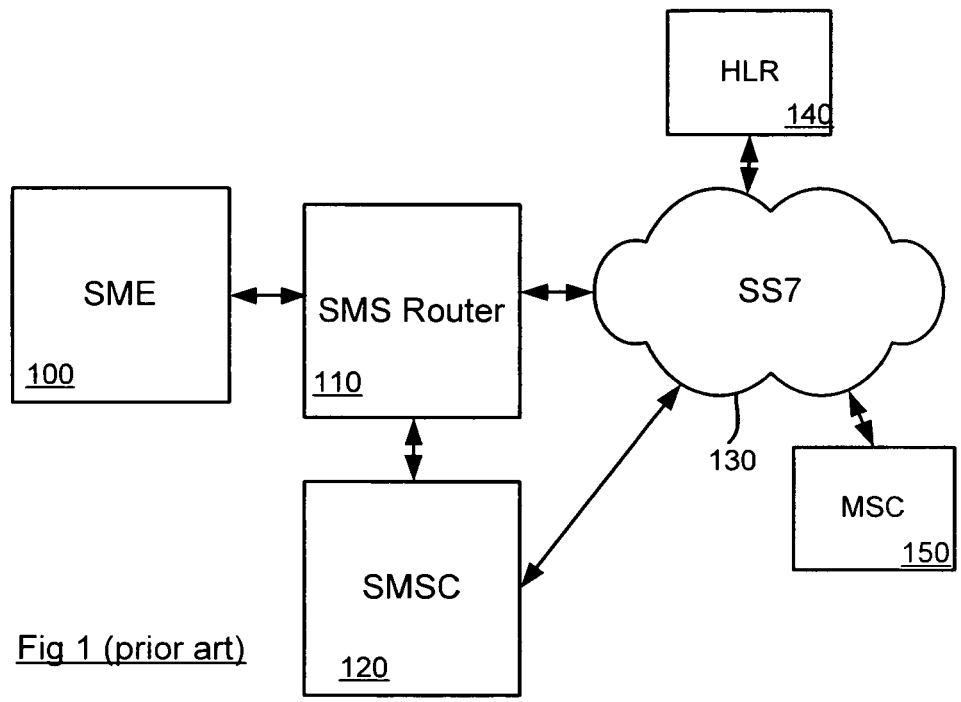
FIG. 1 shows a known architecture for SMS delivery including an SMS router and an SMSC.

FIG. 1 shows a known arrangement in which an Short Message Entity (SME) 100 connects directly to an SMS router 110. An SME is an entity which may receive or send short messages. The SME may be located in the fixed network, a mobile station or another service centre.

The connection between the SME 100 and the SMS Router 110 is generally based on one of a range of proprietary protocols, such as SMPP, UCP/EMI, CIMD/CIMD2 or OIS for instance.

As shown in FIG. 1, SMS router 110 has an interface to an SS7 network 130 and an interface to an SMSC 120. Conventional elements HLR 140 and MSC 150 are also shown in FIG. 1 as being connected to SS7 network 130 in the normal way.

Upon receiving a message from SME 100, SMS Router 110 is able to perform the first SMS delivery attempt. If the first delivery attempt fails, SMS Router 110 provides the message to SMSC 120, which triggers the traditional MAP Store and Forward procedure for message delivery via its own interface to SS7 network 130.

Figure 2A:
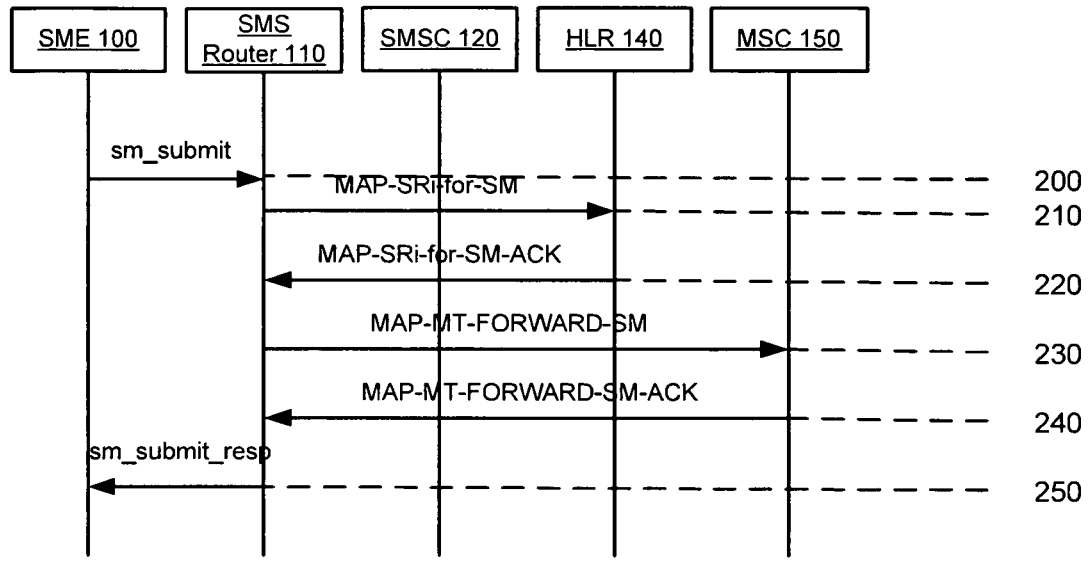
FIG. 2 illustrates the protocols employed in the architecture of FIG. 1.
Figure 2B:
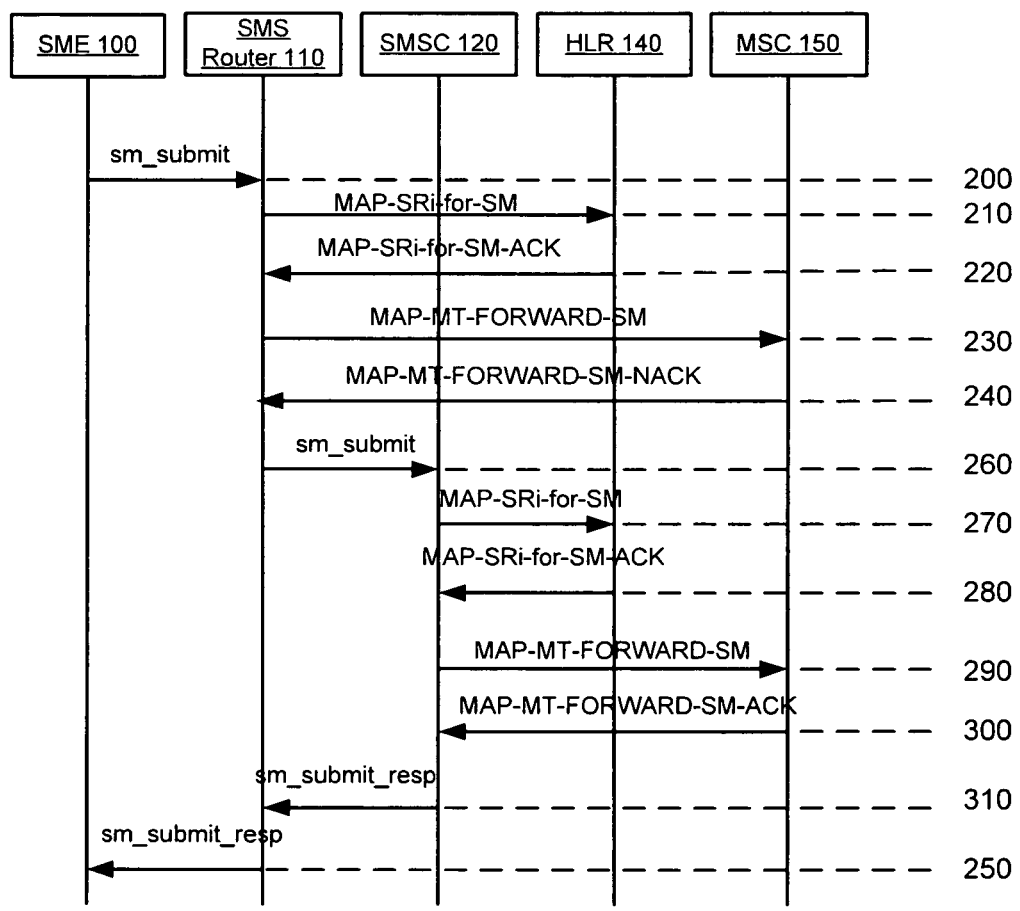

FIGS. 2a and 2b depict data flows in the arrangement of FIG. 1 in the case that the message can be directly delivered (FIG. 2a) and in the case where direct delivery fails (FIG. 2b) for an SMS message sent from an SME to a mobile.

In the example of FIG. 2, the protocol used with SME 100 is assumed to be SMPP.

First SME 100 sends an sm_submit message to SMS router 110. SMS router 110 uses MAP to communicate first with HLR 140 to retrieve routing information necessary for routing the message in an MAP-SRI-FOR-SM exchange—steps 210 and 220, and then with the relevant MSC 150 to transfer the message in a MAP-MT-FORWARD-SM exchange steps 230 and 240. If message delivery is successful then step 240 returns a MAP-MT-FORWARD-SM-ACK message 240. SMS router 110 responds to this by sending a sm-submit-resp message to SME 100 in step 250 to indicate successful delivery of the message.

If in step 240, MSC 150 returns a MAP-FORWARD-SM-NACK message indicating that the delivery was unsuccessful, then SMS router 110 transfers the message to SMSC 120 using, in this example, an SMPP sm-submit message—step 260. SMSC 120 then uses MAP to contact HLR 140 and try to deliver the message in steps 270, 280, 290 and 300, which are repeated until successful message delivery can be achieved according to the normal store and forward protocols.

Once SMSC 120 has received a MAP-MT-FORWARD-ACK from MSC 150 indicating successful delivery of the message, SMSC 120 the sends an sm-submit-resp message to SMS Router 110 to inform it of the successful delivery of the message.—step 310. SMS Router 110 can then carry out step 250 and send an sm_submit_resp to SME 100.

Figure 3:
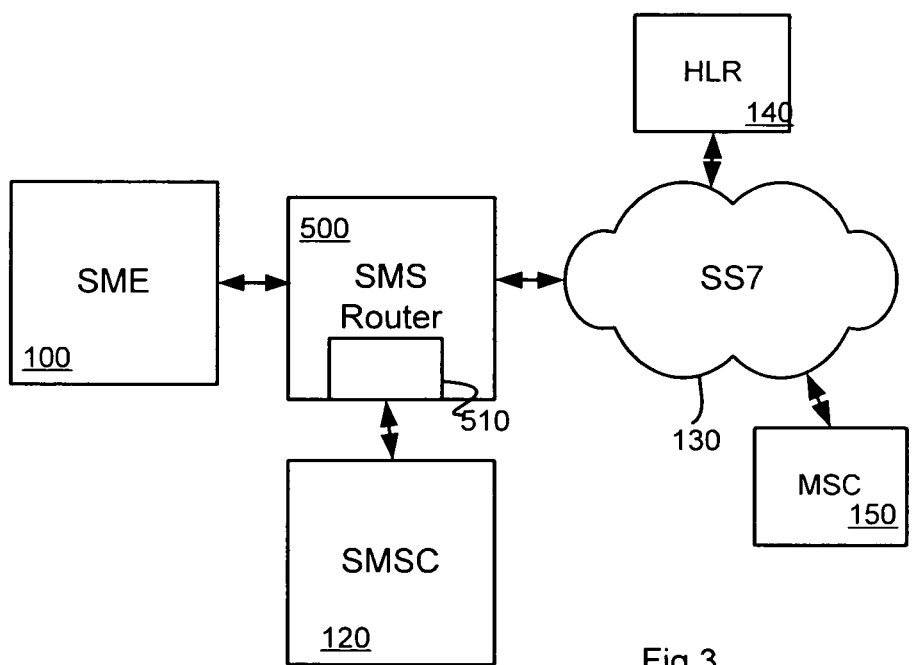
FIG. 3 shows an architecture for SMS delivery in an embodiment of the invention.

FIG. 3 shows an arrangement in which the SMS Router—SMSC communication channel is based on MAP. In this case the SMS Router function is coupled with a SIGTRAN Signalling Gateway function 510 in element 500 and SMSC 120 is configured as a SIGTRAN Application Server (AS). SMSC 120 and router element 500 are interconnected by, for instance, an IP network.

This architecture exploits the MAP property that a mobile to mobile short message transfer is accomplished through the concatenation of 2 MAP procedures: the MAP Mobile Originated procedure and the MAP Mobile Terminated procedure. The mobile terminated procedure consists of all the necessary operations to transfer a short message or status report from the SMSC to a mobile station and return a report to the SMSC containing the result of the message transfer attempt. The mobile originated procedure consists of all the necessary operations to transfer short message from an mobile station to the SMSC and return a report to the mobile station containing the result of the message transfer attempt.

This has the consequence that the MT procedure can be triggered at SMSC 120 by the mobile originated procedure.

Then, taking advantage of this property, the SMS Router 500 can trigger the store and forward capability of SMSC 120 by using the MAP protocol only, either over classical SS7 using a legacy SMSC that has SS7 connectivity or over a SIGTRAN layer as shown in FIG. 3.

Such an arrangement works in the same manner as the arrangement of FIG. 1 and as described in FIG. 2a when the first SMS delivery attempt is successful.

Figure 4:
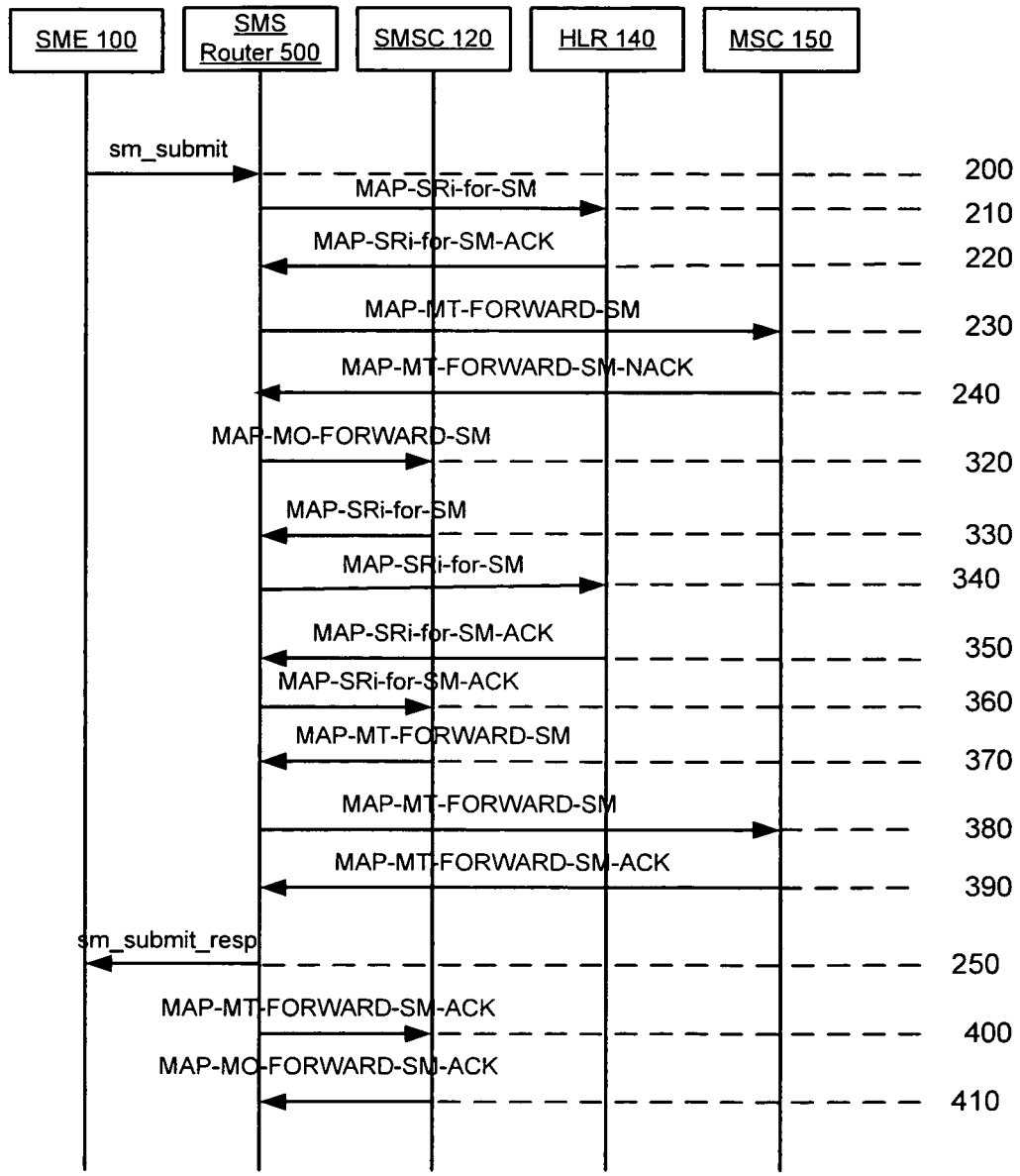
FIG. 4 illustrates the protocol employed in the architecture of FIG. 3 in the event that direct delivery of a message is not possible.

However, the behaviour of SMS Router 500 changes when the first delivery attempt fails as is shown in FIG. 4.

If in step 240, MSC 150 returns a MAP-FORWARD-SM-NACK message indicating that the delivery was unsuccessful, then SMS router 110 transfers the message to SMSC 120 using a MAP-MO-FORWARD-SM message—step 320. In this way the router effectively simulates a mobile station.

SMSC 120 then communicates with HLR 140 and MSC 150 using SMS router/gateway 500 as a SIGTRAN gateway to access the SS7 network to try to deliver the message in steps 330 to 390, which are repeated until successful message delivery can be achieved according to the normal store and forward protocols. Thus, SMSC 120 sends a MAP-SRI-FOR-SM message to SMS router/gateway 500 which is then relayed in step 340 by SMS router/gateway 500 to HLR 140. The response from HLR is similarly relayed by SMS router/gateway 500 back to SMSC 120 in steps 350 and 360. In the same way, the message is forwarded from SMSC 120 to MSC 150 via SMS router/gateway 500 in steps 370 and 380.

As soon as the MAP-MT-FORWARD-SM-ACK indicating successful delivery of the message is received by router/gateway 500 in step 390, router/gateway 500 can carry out step 250 and issue an SM_submit_resp to SME 100 before passing the MAP-MT-FORWARD-SM-ACK to SMSC 120 in step 400 and receiving the MAP-MO-FORWARD-SM-ACK in step 410. Alternatively, SMS Router/gateway 500 could wait until it receives the MAP-MO-FORWARD-SM-ACK before issuing the sm_submit_resp message.

Although a specific embodiment of the invention has been described, the invention is not to be limited to the specific arrangement so described. The invention is limited only by the claims. The claims themselves are intended to indicate the periphery of the claimed invention and are intended to be interpreted as broadly as the language itself allows, rather than being interpreted as claiming only the exemplary embodiment disclosed by the specification.

The invention claimed is:

1. A method for routing short messages in a mobile telecommunications network, the method comprising:
receiving, by a short message service (SMS) router, a short message from a short message element;
attempting, by the SMS router, to deliver the short message without passing through a store and forward function used for repeated attempted deliveries; if the attempted delivery fails, sending, by the SMS router to a short message service center having a store and forward function used for repeated attempted deliveries, the short message in a first Mobile Application Part (MAP) message according to a MAP mobile originated procedure;
receiving, by the SMS router, a second MAP message from the short message service center, the second MAP message containing the short message; and sending, by the SMS router, the second MAP message to a destination of the short message, wherein the short message element is a source mobile station that sent the short message, and the destination is a destination mobile station for receiving the short message.

2. The method as claimed in claim 1 wherein the short message is sent to the short message service center via a SIGTRAN (Signalling Transport) gateway.

3. The method as claimed in claim 1 wherein the MAP mobile originated procedure is to trigger relaying short messages generated as part of a MAP mobile terminated procedure at the short message service center.

4. The method as claimed in claim 3 further comprising issuing a response to the short message element indicating delivery of the short message in response to receipt at the SMS router of an acknowledgement message that forms part of the MAP mobile terminated procedure, the acknowledgement message indicating successful delivery of the short message by the short message service center to the destination.

5. The method as claimed in claim 1, wherein the SMS router simulates a mobile station by using the MAP mobile originated procedure.

6. A method as claimed in claim 1, wherein the first MAP message is part of the MAP mobile originated procedure, and wherein the second MAP message is part of a MAP mobile terminated procedure triggered by the MAP mobile originated procedure.

7. The method as claimed in claim 1, wherein receiving the short message is according to a protocol for bulk transmission and reception of short messages by the short message service center from a network interface.

8. The method as claimed in claim 1, wherein sending the second MAP message by the SMS router to the destination comprises sending the second MAP message by the SMS router to an MSC for delivery by the MSC to the destination that is different from the short message element.

9. The method as claimed in claim 1, wherein the first MAP message is sent from the SMS router to the short message service center over an Internet Protocol (IP) network.

10. A short message service (SMS) router for routing short messages in a mobile telecommunications network, the SMS router comprising:
a receiver to receive a short message from a short message element;
control logic configured to:
attempt to deliver the short message without passing through a store and forward function used for repeated attempted deliveries; and
if the attempted delivery fails, send, to a short message service center having a store and forward function used for repeated attempted deliveries, the short message in a first Mobile Application Part (MAP) message according to a MAP mobile originated procedure;
receive a second MAP message responsive to first MAP message from the short message service center, the second MAP message containing the short message; and
send the second MAP message to a destination of the short message; and wherein the short message element is a source mobile station that sent the short message, and the destination is a destination mobile station for receiving the short message.

11. The router as claimed in claim 10, wherein the first MAP message is part of the MAP mobile originated procedure, and wherein the second MAP message is part of a MAP mobile terminated procedure triggered by the MAP mobile originated procedure.

12. The router as claimed in claim 10, wherein the SMS router is to simulate a mobile station by using the MAP mobile originated procedure.

13. The router as claimed in claim 10, wherein the receiving of the short message is according to a protocol for bulk transmission and reception of short messages by the short message service center from a network interface.

14. The router as claimed in claim 10, wherein sending the second MAP message by the SMS router to the destination comprises sending the second MAP message by the SMS router to an MSC for delivery by the MSC to the destination that is different from the short message element.

15. The router as claimed in claim 10, wherein the short message element is a source mobile station that sent the short message, and the destination is a destination mobile station for receiving the short message.

16. The router as claimed in claim 10, wherein the router is to send the first MAP message to the short message service center over an IP network.

17. The router as claimed in claim 5, further comprising a signalling gateway to send the short message to the short message service center, wherein the signaling gateway is to communicate with the short message service center over an Internet Protocol (IP) network.

18. A method for routing short messages in a mobile telecommunications network, the method comprising:
receiving, by a short message service (SMS) router, a short message from a short message element;
attempting, by the SMS router, to deliver the short message without passing through a store and forward function used for repeated attempted deliveries; if the attempted delivery fails, sending, by the SMS router to a short message service center having a store and forward function used for repeated attempted deliveries, the short message in a first Mobile Application Part (MAP) message according to a MAP mobile originated procedure;
receiving, by the SMS router, a second MAP message from the short message service center, the second MAP message containing the short message; and sending, by the SMS router, the second MAP message to a destination of the short message,
further comprising: receiving, by the SMS router from the short message service center, a further message for accessing a home location register (HLR); and
in response to the further message, sending, by the SMS router to the HLR, the further message.

19. The method as claimed in claim 18, further comprising:
forwarding, by the SMS router to the short message service center, a response to the further message, the response received from the HLR by the SMS router.

* * * * *